United States Patent Office 3,196,154
Patented July 20, 1965

3,196,154
3-SUBSTITUTED-9-METHYL-3,9-DIAZABICYCLO [3.3.1]NONANES
Edgar A. Steck, La Grange, Ill., assignor to Sterling Drug Inc., New York, N.Y., a corporation of Delaware
No Drawing. Filed May 17, 1962, Ser. No. 195,429
20 Claims. (Cl. 260—268)

This invention relates to new and useful chemical compounds which have the 3,9-diazabicyclo[3.3.1]nonane ring system,

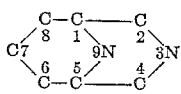

and also to intermediates and processes used in the preparation of the novel heterocyclic compounds.

Specifically, in one of its aspects, my invention relates to 3-R-9-methyl-3,9-diazabicyclo[3.3.1]nonanes having, in the form of their free bases, the structural formula (I) 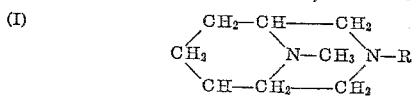

where R is a member selected from the group consisting of lower alkyl; lower alkyl substituted by a substituent selected from the group consisting of hydroxy, lower alkyl-O, $NH_2$, lower alkyl-NH, di(lower alkyl)N, lower alkylmercapto, di(lower alkyl)carbamyl, lower alkyl-O—CO- and carbo- ω- di(lower alkyl)aminoalkyl-oxy groups; lower alkenyl, lower alkynyl, carbo-lower alkyl-oxy; thiocarbamyl substituted by a member selected from the group consisting of allyl, mono- and bi-cyclic aryl, monocarbocyclic-aryl-methyl, and bis(monocarbocyclic-aryl)methyl radicals; lower alkanesulfonyl; monocarbocyclic - arenesulfonyl; di(lower alkyl)sulfamyl; mono carbocyclic-aryl; monocarbocyclic-aryl-lower-alkyl having from one to three substituents on the aromatic ring, and bis(monocarbocyclic-aryl)methyl.

In another of its aspects my invention relates to intermediates for the preparation of the compounds of Formula I, said intermediates having the formula (II) 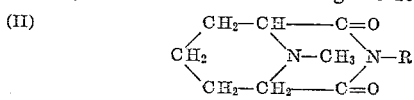

where R has the meaning given above.

In still another aspect, my invention relates to processes for preparing 3 - substituted - 9 - methyl - 3,9 - diazabicyclo[3.3.1]nonanes which comprises reacting 1-lower-alkyl-2,6-bis(carbalkoxy)piperidine having the formula

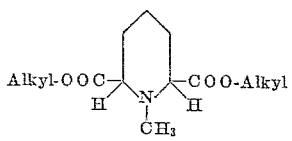

with a primary amine R—$NH_2$, where R is defined above, forming the 3-R-9-methyl - 2,4 - dioxo-3,9-diazabicyclo [3.3.1]nonanes of Formula II, and subsequently reducing the latter compounds with a reducing agent effective for reducing cyclic imides to cyclic amines. An alternative procedure for preparing compounds of Formula I wherein R is a substituent other than aryl comprises preparing the compounds of Formula I wherein R is benzyl, according to the above procedure, reductively debenzylating said compounds according to known hydrogenolysis procedures, and alkylating or acylating the resulting 3-un-substituted-9-methyl-3,9-diazabicyclo[3.3.1]nonane with an alkylating or acylating agent, respectively.

In Formula I, when representing lower alkyl radicals, R is a straight- or branched-chain saturated hydrocarbon radical having from one to six carbon atoms. Examples of lower alkyl radicals are methyl, ethyl, n-propyl, isopropyl, n-butyl, isobutyl, n-amyl, n-hexyl radicals, and the like.

When R represents lower alkyl substituted by a substituent selected from the group consisting of hydroxy, lower alkyl-O—, $NH_2$, lower alkyl-NH, di(lower alkyl)N, lower alkylmercapto, di(lower alkyl)carbamyl, lower alkyl-O—CO and carbo-ω-di(lower alkyl)aminoalkyl-oxy groups, the substituted lower alkyl group contains from 2 to 6 carbon atoms.

The hydroxy-substituted lower alkyl groups contain a hydroxyl group attached at any available position on the alkyl chain. The preferred hydroxy-substituted alkyl groups contain a hydroxyl group or the terminal or ω-carbon, the reactants for preparing compounds having such substituents being readily available. Examples of hydroxy-substituted lower alkyl groups include 2-hydroxyethyl, 3-hydroxypropyl, 4-hydroxybutyl, 5-hydroxypentyl, and 6-hydroxyhexyl.

Lower alkyl-O-substituted lower alkyl groups are commonly called lower alkoxyalkyl groups. The preferred lower alkoxyalkyl substituents bear the alkoxy group in the terminal position of the alkyl chain. Examples of such lower alkyl-O-substituted alkyl groups include 2-methoxyethyl, 2-ethoxyethyl, 3-methoxypropyl, 6-methoxyhexyl, 4-butoxybutyl, 2-hexyloxyethyl, and the like.

Lower alkyl groups substituted by $NH_2$, lower alkyl-NH, and di(lower alkyl)N are primary-, secondary-, and tertiary-amino-lower alkyl groups. The preferred primary-, secondary-, and tertiary-amino-lower alkyl groups contain the amine substituent on the terminal carbon atom of the lower alkyl chain. Examples of lower alkyl groups substituted by $NH_2$, lower alkyl-NH, and di(lower alkyl)N include 2-aminoethyl, 3-aminopropyl, 6-aminohexyl, 4-propylaminobutyl, 5-methylaminopentyl, 2-dimethylaminoethyl, 2-diethylaminoethyl, 3-dimethylaminopropyl, diethylaminohexyl, and the like. In addition, the tertiary-amino group may be a member of a saturated heterocyclic ring such as piperidino, pyrrolidino, piperazino, carbazolino, and the like. Examples of such tertiary-aminoalkyl groups are 2-piperidinoethyl, 3-pyrrolidinopropyl, 2-(5-carbazolyl)ethyl, 4-methylpiperazinoethyl, 3-(4-carbethoxypiperazino)propyl, and the like.

The lower alkylmercapto-substituted lower alkyl groups have a lower alkylmercapto substituent attached at any one available position on the alkyl chain. Preferred lower alkylmercapto lower alkyl groups contain a lower alkylmercapto substituent on the terminal or ω-carbon atom. Examples of such lower alkylmercapto-substituted lower alkyl groups are 2-methyl-mercaptoethyl, 3-ethylmercaptopropyl, 6-methylmercaptohexyl, and the like.

Examples of di(lower alkyl)carbamyl-substituted lower alkyl groups are diethylcarbamylmethyl, dimethylcarbamylethyl, dimethylcarbamylhexyl, and the like.

When representing lower alkyl groups substituted by carbo-ω-di(lower alkyl)aminoalkyl-oxy groups, R is di-(lower alkyl)N—$(CH_2)_n$—O—CO-lower alkyl-, where $n$ is an integer from 2 to 6. Examples of carbo-ω-di(lower alkyl)aminoalkyl-oxy-substituted lower alkyl groups include (carbo-2-diethylaminoethoxy)methyl, (carbo-3-dimethylaminopropoxy)ethyl, (carbo-4-diethylaminobutoxy)hexyl, and the like.

When representing alkenyl, R is a straight- or branched-chain hydrocarbon radical containing one or two double bonds and containing from three to six carbon atoms. Examples of alkenyl radicals include allyl, methallyl, 1-(3-hexenyl), 1-(2,4-pentadienyl), and the like.

When representing alkynyl, R is a straight- or branched-chain hydrocarbon radical containing a triple-bond. Examples of alkynyl radicals include propargyl, 1-(2-butynyl), and 1-(3-hexynyl) radicals.

When R represents a carbo-lower-alkoxy radical, it is lower alkyl-O—CO-, wherein lower alkyl is as defined above. Examples of such carbo-lower-alkoxy radicals are carbomethoxy, carbethoxy, carbopropoxy, carbohexyloxy, and the like.

When R represents thiocarbamyl radicals substituted by a member selected from the group consisting of allyl, mono- and bicyclic-aryl, monocarbocyclic-aryl-methyl, and bis(monocarbocyclic-aryl)methyl, the mono- and bicyclic-aryl groups can be of the carbocyclic or of the heterocyclic class. They have one or two rings and can be substituted by from one to three substituents of low molecular weight. The monocarbocyclic-aryl-methyl groups are unsubstituted benzyl or benzyl substituted with from one to three substituents of low molecular weight. The bis(monocarbocyclic-aryl) methyl groups are unsubstituted benzhydryl or benzhydryl substituted in either or both rings with from one to three substituents of low molecular weight. The substituents attached to either aryl or aralkyl radicals can be the same or different, and have a total molecular weight less than 200. Examples of suitable substituents are hydroxy, lower alkoxy, lower alkylmercapto, halo, nitro, lower alkyl, amino, trifluoromethyl, and the like. Preferred mono- and bicyclic-aryl radicals are phenyl or naphthyl, each either unsubstituted or substituted with from one to three substituents of low molecular weight. Examples of such substituted thiocarbamyl radicals include phenylthiocarbamyl, 4-pyridyl-thiocarbamyl, 4-chlorophenyl-thiocarbamyl 6-(4-amino-2-methylquinolinyl)-thiocarbamyl, 2-furyl-thiocarbamyl, 4-chlorobenzyl-thiocarbamyl, 4-chlorobenzhydryl-thiocarbamyl, 4-butylmercaptobenzhydryl-thiocarbamyl, 3-[(4-amino-2-methyl-6-quinolinyl)-thiocarbamyl], 2-naphthyl-thiocarbamyl, 1-(4-chloronaphthyl)-thiocarbamyl, and the like.

When representing lower alkanesulfonyl, R is a saturated aliphatic sulfonyl radical containing from one to six carbon atoms. Examples of such lower alkanesulfonyl radicals are methanesulfonyl, ethanesulfonyl, n-propanesulfonyl, n-butanesulfonyl, isobutanesulfonyl, n-hexanesulfonyl, and the like.

When representing monocarbocyclic-arenesulfonyl, R is benzenesulfonyl or benzenesulfonyl substituted on the benzene ring by from one to three substituents of low molecular weight. Suitable substituents are lower alkyl, lower-alkyl-oxy, nitro, halo, and lower-alkylmercapto groups. Examples of monocarbocyclic-arenesulfonyl groups are benzenesulfonyl, 4-toluenesulfonyl, 4-chlorobenzenesulfonyl, 4-bromobenzenesulfonyl, 3-nitrobenzenesulfonyl, 4-methoxybenzenesulfonyl, and the like.

When R represents monocarbocyclic aryl, monocarbocyclic-aryl-lower-alkyl having from one to three inert substituents on the aromatic ring, and bis(monocarbocyclic-aryl)methyl, the aryl portion is a member of the benzene series. Where substituents are present, they can be the same or different and can occupy any of the available positions on the aromatic ring, and they have total molecular weight less than 200. Suitable substituents are, for example, hydroxy, lower alkoxy, lower alkylmercapto, amino, di(lower alkyl)amino, halo, lower-alkyl, nitro, trifluoromethyl, and the like. Examples of monocarbocyclic aryl radicals encompassed by the invention include phenyl, 4-nitrophenyl, 3-chloro-4-methylphenyl, 2-methoxyphenyl, 4-methylcercaptophenyl, 3-bromophenyl, 4-trifluoromethylphenyl, 4-hydroxyphenyl, 4-dimethyl-aminophenyl, 4-iodophenyl, and the like. Examples of monocarbocyclic-aryl-lower-alkyl radicals encompassed by the invention include benzyl, 4-bromobenzyl, 4-nitrobenzyl, 4-trifluoromethylbenzyl, 3,4,5-trimethoxyphenylethyl, 4-aminophenylethyl, and the like. Examples of bis(monocarbocyclic-aryl)methyl radicals encompassed by the invention include benzhydryl, 4-butylmercaptobenzhydryl, 4-chlorobenzhydryl, 4,4'-diiodobenzhydryl, 4-hydroxy-4-methoxybenzhydryl, 4,4-bis(dimethylamino)benzhydryl, 2-chlorobenzhydryl, and the like.

When representing di(lower alkyl)sulfamyl, R is $-SO_2-N(lower\ alkyl)_2$ where lower alkyl is defined above. Examples of di(lower alkyl)sulfamyl include diethylsulfamyl, dimethylsulfamyl, di(n-hexyl)sulfamyl, and the like.

The compound 9-methyl-3,9-diazabicyclo[3.3.1]nonane is known in the art. Said compound is useful as a starting material for preparing many of the novel compositions of this invention by alkylation and acylation procedures. Suitable acylating agents are lower alkyl esters of organic carboxylic and sulfonic acids, acyl halides, acyl anhydrides, isocyanates and isothiocyanates. Suitable alkylating agents are substituted- or unsubstituted-alkyl esters of strong acids, for example, substituted- or unsubstituted-alkyl halides, sulfates, and arylsulfonates. Alkylation can also be accomplished by other standard alkylation reactions, for example, reductive alkylation, Mannich alkylation, cyanoethylation, and the like.

The compounds of Formula I substituted in the 3-position by a monocarbocyclic-aryl substituent, which are not available by the latter procedure, can be prepared by the following process: a diester of N-alkyl-piperidine-2,6-dicarboxylic acid is heated at 150–350° for 12–48 hours with aniline or a substituted aniline to produce 3-aryl-9-alkyl-2,4-dioxo-3,9-diazabicyclo-[3.3.1]nonane, which is reduced with lithium aluminum hydride, or hydrogen over a suitable catalyst, to give 3-aryl-9-alkyl-3,9-diazabicyclo[3.3.1]nonane. The reduction is carried out in an inert reaction medium, preferably in an ether, for example, diethyl ether, tetrahydrofuran, anisole, dibutyl ether, and the like. It is desirable to carry out the reaction at the reflux temperature of the solvent employed, although in most cases reduction occurs slowly at room temperature.

The 3,9-diazabicyclo[3.3.1]nonanes are basic substances and are most conveniently used in the form of their water-soluble physiologically-acceptable acid-addition salts. Physiologically-acceptable salts are salts the anions of which are relatively innocuous to the animal organism when administered in the therapeutic dosages. Appropriate acid-addition salts are those prepared by the addition of mineral acids, for example, hydrochloric acid, hydrobromic acid, nitric acid, sulfuric acid, phosphoric acid and the like, and from organic carboxylic and sulfonic acids, for example, acetic acid, citric acid, tartaric acid, lactic acid, gluconic acid, maleic acid, methanesulfonic acid, benzenesulfonic acid, meconic acid, p-chlorobenzenesulfonic acid, and the like.

Although the acid-addition salt forms preferably have anions which are pharmacologically acceptable, salts having toxic anions are also useful in that they may serve as characterizing derivatives of the free bases and serve as intermediates for non-toxic salts by way of ion-exchange reactions. All acid-addition salts, regardless of the nature of the anions, are useful as intermediates in the purification of the free bases.

The acid-addition salt forms are prepared by dissolving the free base in an aqueous solution containing the appropriate acid and isolating the salt by evaporating the solvent, or by reacting the free base and the acid in an organic solvent, in which case the salt separates directly or can be isolated by concentrating the solution. The number of equivalents of acid which enter into salt formation depends upon the amount of acid present and upon the number of amino groups present in the free base. If an excess of acid is used, the number of equivalents of acid used will equal the number of basic nitrogens present in the free base.

Still another aspect of my invention comprises the quaternary ammonium salt forms of the free bases shown in Formulas I and II. The quaternary ammonium salt forms are obtained by the addition of alkyl, alkenyl, and aralkyl esters of inorganic acids or organic sulfonic acids to the free base form of the compounds. The alkyl, alkenyl, and aralkyl esters so used include such compounds as methyl sulfate, methyl benzenesulfonate, ethyl p-chlorobenzenesulfonate, benzyl chloride, benzyl bromide, p-nitrobenzyl chloride, o-chlorobenzyl, and the like.

The quaternary ammonium salts are prepared by mixing the free base and the alkyl, alkenyl, or aralkyl esters in an organic solvent. Heating may be used to facilitate the reaction, although salt formation in some cases takes place readily at room temperature. The quaternary ammonium salt separates directly or can be isolated by concentration of the solution. The number of equivalents of alkyl ester entering into salt formation depends upon the amount of ester present relative to the amount of free base and on the number of basic amino groups present in the free base. If an excess of alkyl halide or other ester is used as a quaternizing agent, some or all of the basic amino groups present in the free base may be quaternized, depending upon the reaction conditions such as the temperature.

Like the acid-addition salts, the quaternary ammonium salts are useful for characterizing the free bases of the invention. Hence, the toxicity or non-toxicity of the particular anion associated with the quaternary cation is of little significance, and for this purpose a toxic quaternary ammonium salt can be as useful as a non-toxic one. It is possible to convert one salt to another having a different anion by conventional ion exchange reactions.

The compounds of my invention have been found by standard pharmacological and chemotherapeutic testing procedures to have spasmolytic, parasiticidal, and barbiturate potentiating activities, indicating their usefulness in the treatment of peptic ulcer and pylorospasm, in the treatment of schistosomiasis and amebiasis, and as adjuvants in producing barbiturate hypnosis.

The structures of the compounds were determined by their mode of preparation and by the correspondence of calculated and found values for elemental analyses of representative samples.

The following examples further illustrate the invention without the latter being limited thereto.

EXAMPLE 1A

*3-benzyl-9-methyl-2,4-dioxo-3,9-diazabicyclo[3.3.1]nonane*

A mixture containing 208 g. (0.967 mole) of dimethyl scopolinate and 256 g. (2.56 moles) of benzylamine was heated at reflux for 48 hours. The excess benzylamine was distilled under reduced pressure, and the glassy residue remaining was extracted four times with one liter portions of hot n-hexane. The product was allowed to crystallize from the combined cooled extracts. The pure 3-benzyl-9-methyl-2,4-dioxo-3,9-diazabicyclo[3.3.1]-nonane thus obtained melted at 114–116° C. The monohydrochloride salt prepared from the free base melted with decomposition at 202.0–210.0° C. (corr.).

EXAMPLE 1B

*3-benzyl-9-methyl-3,9-diazabicyclo[3.3.1]nonane*

To a slurry of 4.8 g. of lithium aluminum hydride in 600 ml. of dry ether was added 14.2 g. of 3-benzyl-9-methyl - 2,4 - dioxo-3,9-diazabicyclo[3.3.1]nonane. The mixture was stirred at room temperature for 72 hours. Absolute ethanol was then added dropwise, and the reaction mixture was made basic with an excess of 20% sodium hydroxide solution. The mixture was then extracted with ether, and the solvent was distilled leaving a light oily residue of 3-benzyl-9-methyl-3,9-diazabicyclo[3.3.1]nonane. The monohydrogen citrate salt melted with decomposition at 130.8-137.6° C. (corr.).

EXAMPLE 1C

*9-methyl-3,9-diazabicyclo[3.3.1]nonane*

A solution containing 11.5 g. (0.05 mole) of 3-benzyl-9 - methyl - 3,9 - diazabicyclo[3.3.1]nonane in 150 ml. of ethanol was acidified with concentrated hydrochloric acid and was hydrogenated over 1.5 g. of 5% palladium-on-charcoal at 46 p.s.i. in a bottle-type hydrogenator. The theoretical quantity of hydrogen was absorbed in 7 hours. The suspended solids were collected and extracted several times with boiling water. The aqueous extracts were then combined with the filtrate and concentrated under reduced pressure leaving a solid consisting of 9-methyl-3,9-diazabicyclo[3.3.1]nonane dihydrochloride, which melted at >300° C. (corr.).

EXAMPLE 2

*3-(2-dimethylaminoethyl)-9-methyl-3,9-diazabicyclo [3.3.1]nonane trihydrochloride*

A mixture containing 15.3 g. (0.07 mole) of 9-methyl-3,9 - diazabicyclo[3.3.1]nonane dihydrochloride, 11 g. (0.07 mole) of β-dimethylaminoethyl chloride hydrochloride, 14.9 g. (0.014 mole) of anhydrous sodium carbonate, and 100 ml. of ethanol was refluxed with stirring for 18 hours. The inorganic residues were filtered from the hot solution, and the filtrate was concentrated under reduced pressure. The resulting near-solid was recrystallized from absolute ethanol-absolute ether and then from methanol to give 3-(2-dimethylaminoethyl)-9-methyl-3,9-diazabicyclo[3.3.1]nonane trihydrochloride, which melted with decomposition at 230.6–235.4° C. (corr.).

The bis-methobromide melted at 274.8–275.8° C.

EXAMPLE 3

*3-carbethoxy-9-methyl-3,9-diazabicyclo[3.3.1]nonane dihydrogen citrate*

A mixture containing 14.3 g. (0.07 mole) of 9-methyl-3,9-diazabicyclo[3.3.1]nonane, 25.2 g. (0.3 mole) of sodium bicarbonate, 7.3 g. (0.07 mole) of ethyl chlorocarbonate, and 37 ml. of absolute ethanol was refluxed with stirring for 7 hours. The solvent was removed under reduced pressure, and the remaining solid was treated with hot water. The aqueous solution was made basic with 50% sodium hydroxide solution and the oil which separated was drawn off. The oil consisting of 3-carbethoxy-9-methyl-3,9-diazabicyclo[3.3.1]nonane was distilled, B.P. 81–82° C. at 0.5 mm. The dihydrogen citrate salt melted with decomposition at 116.2–130° C. (corr.).

EXAMPLE 4

*3[(4-chlorobenzhydryl)thiocarbamyl]-9-methyl-3,9-diazabicyclo[3.3.1]nonane dihydrogen citrate*

A solution containing 12.5 g. (0.048 mole) of 4-chlorobenzhydrylisothiocyanate and 6.70 g. (0.048 mole) of 9-methyl-3,9-diazabicyclo[3.3.1]nonane in 50 ml. of dry benzene was refluxed for one hour and the reaction mixture was cooled to room temperature, 3-[(4-chlorobenzhydryl)thiocarbamyl] - 9 - methyl-3,9-diazabicyclo[3.3.1] nonane separated as a white solid which, following recrystallization from cyclohexane, melted at 113–115° C. The dihydrogen citrate salt melted with decomposition at 137.4–153.0° C. (corr.).

EXAMPLE 5A

*2,4-dioxo-9-methyl-3-phenyl-3,9-diazabicyclo[3.3.1] nonane*

Following the procedure given in Example 1A, 21.5 g. (0.1 mole) of dimethyl scopolinate was reacted with 23.3 g. (0.25 mole) of aniline. The excess aniline was removed by steam distillation. The aqueous mixture was then repeatedly extracted with ether and the solvent was removed from the extracts. The remaining crude 2,4-dioxo - 9 - methyl - 3 - phenyl - 3,9 - diazabicyclo[3.3.1] nonane was crystallized from n-hexane giving pure 2,4- dioxo - 9 - methyl - 3 - phenyl - 3,9 - diazabicyclo[3.3.1]nonane which melted at 150.6–155.0° C. (corr.).

EXAMPLE 5B

*9-methyl-3-phenyl-3,9-diazabicyclo[3.3.1]nonane dihydrogen citrate*

Following the procedure given in Example 1B, 10.5 g. (0.043 mole) of 3-phenyl-9-methyl-2,4-dioxo-3,9-diazabicyclo[3.3.1]nonane was reduced with 3.55 g. of lithium aluminum hydride in dry ether. 9-methyl-3-phenyl-3,9-diazabicyclo[3.3.1]nonane was obtained as an amber oil. 9-methyl-3-phenyl-3,9-diazabicyclo[3.3.1]nonane dihydrogen citrate, prepared from the free base melted at 124.0–128.4° C. (corr.).

EXAMPLE 6

*3,9-dimethyl-3,9-diazabicyclo[3.3.1]nonane dihydrochloride*

A solution containing 14.0 g. (0.1 mole) of 9-methyl-3,9-diazabicyclo[3.3.1]nonane, 12.5 g. of formalin solution and 60 ml. of methanol was reduced over 10% palladium-on-charcoal at 15–25 p.s.i. in a bottle-type hydrogenator. Complete reduction occurred in 3 hours. After the catalyst had been removed, the filtrate was concentrated under reduced pressure, and the remaining oil was distilled to give 3,9-dimethyl-3,9-diazabicyclo[3.3.1]nonane, B.P. 65–67° C. at 10 mm. The dihydrochloride salt prepared from the free base melted with decomposition at 292.6–296.0° C. (corr.).

EXAMPLE 7

*9-methyl-3-phenylazo-3,9-diazabicyclo[3.3.1]nonane*

A chilled aqueous solution of 0.06 mole of benzenediazonium chloride was added to a solution containing 14.0 g. (0.066 mole) of 9-methyl-3,9-diazabicyclo[3.3.1]nonane dihydrochloride and 34 g. (0.25 mole) of sodium acetate trihydrate in about 50 ml. of water. The solution was stirred at 0° for an hour and allowed to warm to room temperature. The solution was then extracted with ether, and to the ether extracts was added ethereal HCl. The red oil which separated was crystallized with absolute ethanol. The crude 9-methyl-3-phenylazo-3,9-diazabicyclo[3.3.1]nonane hydrochloride was made basic with 35% sodium hydroxide solution and the resulting oil was distilled, giving pure 9-methyl-3-phenylazo-3,9-diazabicyclo[3.3.1]nonane, boiling at 130° C. at 0.007 mm.; $n_D^{25}=1.6208$.

EXAMPLE 8

*3-(3-indolyl)methyl-9-methyl-3,9-diazabicyclo[3.3.1]nonane*

An ice-cold solution containing 9.9 g. (0.07 mole) of 9-methyl-3,9-diazabicyclo[3.3.1]nonane, 9.8 g. of glacial acetic acid, 5.85 g. (0.068 mole) of 35% formalin, and 8.1 g. (0.069 moles) of indole was allowed to stand at room temperature for five days. The solution was then diluted with about 25 ml. of water and was made basic with 25 ml. of 50% sodium hydroxide solution. The basic solution was then extracted with benzene and the benzene solution was dried. The addition of n-pentane caused the crystallization of crude 3-(3-indolyl)methyl-9-methyl-3,9-diazabicyclo[3.3.1]nonane. Recrystallized from n-hexane, the pure 3-(3-indolyl)methyl-9-methyl-3,9-diazabicyclo[3.3.1]nonane melted at 144–149.4° C. (corr.).

EXAMPLE 9A

*3-benzyl-7-methoxy-9-methyl-2,4-dioxo-3,9-diazabicyclo[3.3.1]nonane*

Following the procedure given in Example 1A, 1.29 moles of benzylamine was reacted with 0.514 mole of dimethyl 4-methoxy-1-methyl-2,6-piperidinedicarboxylate (prepared by catalytic reduction of dimethyl 4-methoxy-2,6-pyridinedicarboxylate, followed by reductive methylation of the resulting dimethyl 4-methoxy-2,6-piperidinedicarboxylate). Recrystallized from n-pentane the product, 3 - benzyl-7-methoxy-9-methyl-2,4-dioxo-3,9-diazabicyclo[3.3.1]nonane melted at 66–68° C. The mono-hydrochloride salt melted with decomposition at 167.8–174.2° C. (corr.).

EXAMPLE 9B

*3-benzyl-7-methoxy-9-methyl-3,9-diazabicyclo[3.3.1]nonane*

Following the procedure given in Example 1B, 3-benzyl - 7 - methoxy - 9 - methyl - 2,4 - dioxo - 3,9 - diazabicyclo[3.3.1]nonane was reduced with lithium aluminum hydride in absolute ether to give 3-benzyl-7-methoxy-9-methyl-3,9-diazabicyclo[3.3.1]nonane, boiling at 127° C. at 0.02 mm. A crude sample of the citrate salt melted with decomposition at 125° C.

The following compounds are prepared according to the procedure given in Example 1A, using the designated amine in place of benzylamine:

3 - (3 - chloro - 4 - methylphenyl) - 9 - methyl - 2,4 - dioxo-3,9-diazabicyclo[3.3.1]nonane, melting at 138.4–148.6° C. (corr.), from 4-methyl-3-chloroaniline;

3 - (4 - nitrophenyl) - 9 - methyl - 2,4 - dioxo - 3,9 - diazabicyclo[3.3.1]nonane from 4-nitroaniline;

3 - (3 - methoxyphenyl) - 9 - methyl - 2,4 - dioxo - 3,9-diazabicyclo[3.3.1]nonane from 3-anisidine;

3 - (4 - methylmercaptophenyl) - 9 - methyl - 2,4 - dioxodiazabicyclo[3.3.1]nonane from 4-thioanisidine;

3 - (3 - bromophenyl) - 9 - methyl - 2,4 - dioxo - 3,9-diazabicyclo[3.3.1]nonane from 3-bromoaniline;

3 - (4 - trifluoromethylphenyl) - 9 - methyl - 2,4 - dioxo-3,9-diazabicyclo[3.3.1]nonane from 4-trifluoromethylaniline;

3 - (4 - hydroxyphenyl) - 9 - methyl - 2,4 - dioxo - 3,9-diazabicyclo[3.3.1]nonane from 4-hydroxyaniline; and 3 - (4 - dimethylaminophenyl) - 9 - methyl - 2,4 - dioxo-3,9-diazabicyclo[3.3.1]nonane from 4-dimethylaminoaniline.

The following compounds are prepared according to the procedure given in Example 1B by reduction of the corresponding 2,4-dioxo - 3,9 - diazabicyclo[3.3.1]nonane mentioned above:

3 - (3 - chloro - 4 - methylphenyl) - 9 - methyl - 3,9 - diazabicyclo[3.3.1]nonane dihydrogen citrate, melting at 127.6–130.4° C. (corr.);

3 - (4 - aminophenyl) - 9 - methyl - 3,9 - diazabicyclo[3.3.1]nonane, from the corresponding 4-nitrophenyl compound, above;

3 - (3 - methoxyphenyl) - 9 - methyl - 3,9 - diazabicyclo[3.3.1]nonane;

3 - (4 - methylmercaptophenyl) - 9 - methyl - 3,9 - diazabicyclo[3.3.1]nonane;

3 - (3 - bromophenyl) - 9 - methyl - 3,9 - diazabicyclo[3.3.1]nonane;

3 - (4 - trifluoromethylphenyl) - 9 - methyl - 3,9 - diazabicyclo[3.3.1]nonane;

3 - (4 - hydroxyphenyl) - 9 - methyl - 3,9 - diazabicyclo[3.3.1]nonane; and

3 - (4 - dimethylaminophenyl) - 9 - methyl - 3,9 - diazabicyclo[3.3.1]nonane.

Following the procedure given in Example 3, the following compounds are prepared by reacting 9-methyl-3,9-diazabicyclo[3.3.1]nonane with the designated acylating agent:

3 - diethylcarbamyl - 9 - methyl - 3,9 - diazabicyclo[3.3.1]nonane dihydrogen citrate, melting with a decomposition at 141.2–144.6° C. (corr.), from diethylcarbamyl chloride;

3-ethanesulfonyl - 9 - methyl - 3,9 - diazabicyclo[3.3.1]nonane, melting at 63.2–66.0° C. (corr.), from ethanesulfonyl chloride;

3 - dimethylsulfamyl - 9 - methyl - 3,9 - diazabicyclo[3.3.1]nonane hydrochloride, melting with decomposition at 247.4–249.0° C. (corr.), from dimethylsulfamyl chloride;

9 - methyl - 3 - (4-methylphenylsulfonyl)-3,9-diazabicyclo[3.3.1]nonane dihydrogen citrate, melting with decomposition at 72.4–92.4° C. (corr.), from 4-toluenesulfonyl chloride; and 3 - (4 - methoxyphenylsulfonyl) - 9-methyl-3,9-diazabicyclo[3.3.1]nonane, melting at 137.8–143.8° C. (corr.), from 4-methoxyphenylsulfonyl chloride.

Following the procedure given in Example 4, the following compounds are prepared from 9-methyl-3,9-diazabicyclo[3.3.1]nonane and the designated isocyanate or isothiocyanate:

3 - [(4 - butylmercaptobenzhydryl)thiocarbamyl] - 9 - methyl-3,9-diazabicyclo[3.3.1]nonane dihydrogen citrate, melting with decomposition at 124.2–145.2° C. (corr.), from 4-butylmercaptobenzhydrylisothiocyanate;

3 - [(4 - chlorobenzhydryl)carbamyl] - 9 - methyl-3,9-diazabicyclo[3.3.1]nonane dihydrogen citrate, melting with decomposition at 169.4–171.4° C. (corr.), from 4-chlorobenzhydrylisocyanate;

3 - carbamyl - 9 - methyl-3,9-diazabicyclo[3.3.1]nonane, melting at 175.4–178.6° C. (corr.), from potassium cyanate;

3 - (allylthiocarbamyl) - 9 - methyl - 3,9 - diazabicyclo[3.3.1]nonane dihydrogen citrate, melting at 75.6–84.6° C. (corr.), from allylisothiocyanate;

3-(4-chlorobenzylthiocarbamyl) - 9 - methyl 3,9-diazabicyclo[3.3.1]nonane, melting at 144.6–146.8° C. (corr.), from 4-chlorobenzylisothiocyanate;

3 - [(4 - amino - 2 - methyl-6-quinolinyl)thiocarbamyl]-9-methyl-3,9-diazabicyclo[3.3.1]nonane phosphate, melting with decomposition at 229.6–231.2° C. (corr.), from 4 - amino - 2-methyl-6-quinolinylisothiocyanate, which is prepared according to known procedures from 4,6-diaminoquinaldine and thiophosgene;

3 - thiocarbamyl - 9 - methyl-3,9-diazabicyclo[3.3.1]nonane, from potassium thiocyanate; and 3 - (2 - naphthylthiocarbamyl) - 9 - methyl-3,9-diazabicyclo[3.3.1]nonane, from 2-naphthylisothiocyanate.

Following the procedure given in Example 2, the following compounds are prepared from 9-methyl-3,9-diazabicyclo[3.3.1]nonane and the designated alkylating agent:

3 - (2 - methylmercaptoethyl) - 9 - methyl-3,9-diazabicyclo[3.3.1]nonane dihydrogen citrate, melting with decomposition at 136.8–137.8° C. (corr.), from β-methylmercaptoethyl bromide;

3 - (2 - hydroxyethyl)-9-methyl-3,9-diazabicyclo[3.3.1]nonane dihydrogen citrate, melting at 112.2–114.4° C. (corr.), from ethylenebromohydrin;

3 - dimethylaminopropyl - 9 - methyl - 3,9 - diazabicyclo[3.3.1]nonane trihydrochloride, melting at 227.0–233.8° C. (corr.), from 3-dimethylaminopropyl bromide. The methobromide, which was extremely hygroscopic, melted at 279.6–280.4° C. (corr.);

3 - (4 - chlorobenzhydryl) - 9 - methyl-3,9-diazabicyclo[3.3.1]nonane dihydrogen citrate, which melted indefinitely starting at 103.6° C. (corr.), from 4-chlorobenzhydryl chloride;

3 - [3 - (4 - carbethoxy-1-piperazinyl)propyl]-9-methyl-3,9-diazabicyclo[3.3.1]nonane phosphate, melting with decomposition at 180.4–182.0° C. (corr.), from 3-(4-carbethoxy-1-piperazinyl)propyl chloride; the free base was an oil having a refractive index, $n_D^{25}$=1.5074;

3 - (3 - hydroxypropyl) - 9 - methyl-3,9-diazabicyclo[3.3.1]nonane dihydrogen citrate, melting with decomposition at 75.2–96.0° C. (corr.), from trimethylene bromohydrin;

The 3,4,5-trimethoxybenzoic acid ester of 3-(3-hydroxypropyl)-9-methyl-3,9-diazabicyclo[3.3.1]nonane dihydrogen citrate, melting with decomposition at 97.2–99.4° C. (corr.), was prepared by reacting the latter compound with 3,4,5-trimethoxybenzoyl chloride;

3 - (3,4,5 - trimethoxyphenylethyl) - 9 - methyl-3,9-diazabicyclo[3.3.1]nonane dihydrogen citrate, melting with decomposition at 144.6–146.2° C. (corr.) from 2-(3,4,5-trimethoxyphenyl)ethyl bromide;

3 - carbethoxymethyl-9-methyl-3,9-diazabicyclo[3.3.1]nonane dihydrogen citrate, melting at 102.4–106.4° C. (corr.), from ethyl chloroacetate;

3 - (carbo-2-diethylaminoethoxy)methyl-9-methyl-3,9-diazabicyclo[3.3.1]nonane, boiling at 113° C. at 0.02 mm., $n_D^{25}$=1.4849, was prepared from 3-carbethoxymethyl-9-methyl-3,9-diazabicyclo[3.3.1]nonane by cross-esterification of the latter with 2-dimethylaminoethanol;

3 - (1 - hydroxy - 1,2,3,4 - tetrahydro-2-naphthyl)-9-methyl-3,9-diazabicyclo[3.3.1]nonane dihydrogen citrate, melting with decomposition at 142.2–145.2° C. (corr.), from 2-bromo-1-tetralol;

3 - (4 - butylmercaptobenzhydryl) - 9 - methyl-3,9-diazabicyclo[3.3.1]nonane dihydrogen citrate, melting with decomposition at 76.8–101.2° C. (corr.), from 4-butylmercaptobenzhydryl chloride;

3 - [2 - (4 - methyl - 1 - piperazinyl)ethyl]-9-methyl-3,9-diazabicyclo[3.3.1]nonane dimecorate, melting with decomposition at 184° C. (corr.), from 2(4-methyl-1-piperazinyl)ethyl chloride;

3 - [2 - (9 - carbazolyl)ethyl] - 9 - methyl-3,9-diazabicyclo[3.3.1]nonane dihydrochloride, melting at 238.8–239.4° C. (corr.), from 2-(9-carbazolyl)ethyl chloride;

9 - methyl - 3 - propargyl - 3,9 - diazabicyclo[3.3.1]nonane dihydrogen citrate, melting at 129.0–132.0° C. (corr.), from propargyl bromide;

9-methyl-3-allyl-3,9-diazabicyclo[3.3.1]nonane dihydrogen citrate, melting at 123.4–124.4° C. (corr.), from allyl bromide;

3 - diethylcarbamylmethyl - 9 - methyl-3,9-diazabicyclo[3.3.1]nonane phosphate, melting indefinitely starting at 152.4° C. (corr.), from N,N-diethyl chloroacetamide;

9 - methyl - 3 - (4-nitrobenzyl)-3,9-diazabicyclo[3.3.1]nonane monohydrogen citrate, melting with decomposition at 177.0–177.9° C. (corr.), from 4-nitrobenzyl chloride;

3 - (2 - chlorobenzhydryl) - 9-methyl-3,9-diazabicyclo[3.3.1]nonane dihydrogen citrate, melting with decomposition at 100.8–114.6° C. (corr.), from 2-chlorobenzhydryl chloride;

3 - (2,4-dichlorobenzyl) - 9 - methyl - 3,9 - diazabicyclo[3.3.1]nonane dihydrochloride, melting indefinitely starting at 190.4° C. (corr.), from 2,4-dichlorobenzyl chloride;

3 - (5 - methylaminopentyl) - 9-methyl-3,9-diazabicyclo[3.3.1]nonane from 1-chloro-5-methylaminopentane;

3 - (6 - aminohexyl) - 9-methyl-3,9-diazabicyclo[3.3.1]nonane from 1-chloro-6-aminohexane; and 3 - (2 - ethoxyethyl) - 9-methyl-3,9-diazabicyclo[3.3.1]nonane from ethoxyethyl chloride.

I claim:

1. A compound of the formula

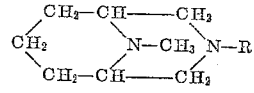

wherein R is lower alkenyl.

2. A compound of the formula

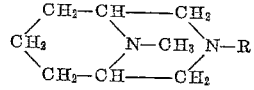

wherein R is a member of the group consisting of benzenesulfonyl and benzenesulfonyl substituted with from one to three substituents selected from the group consisting of lower alkyl, lower alkyl-oxy, nitro, halo, and lower alkylmercapto.

3. A compound of the formula

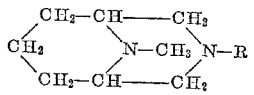

wherein R is hydroxy-lower-alkyl.

4. A compound of the formula

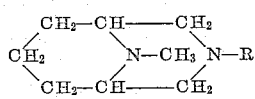

wherein R is a member of the group consisting of benzhydryl and benzhydryl in which at least one benzene ring thereof is substituted with from one to three substituents selected from the group consisting of hydroxy, lower alkoxy, lower alkylmercapto, amino, di(lower alkyl)amino, halo, lower alkyl, nitro and trifluoromethyl.

5. 3 - (3 - chloro - 4-methylphenyl)-9-methyl-3,9-diazabicyclo[3.3.1]nonane.

6. 3-allyl-9-methyl-3,9-diazabicyclo[3.3.1]nonone.

7. 3 - carbethoxy - 9 - methyl-3,9-diazabicyclo[3.3.1]nonane.

8. 3 - diethylcarbamyl-9-methyl-3,9-diazabicyclo[3.3.1]nonane.

9. 3 - [(4 - chlorobenzhydryl)thiocarbamyl]-9-methyl-3,9-diazabicyclo[3.3.1]nonane.

10. 3-[(4-amino-2-methyl-6-quinolinyl)thiocarbamyl]-9-methyl-3,9-diazabicyclo[3.3.1]nonane.

11. 3 - (4 - methylphenylsulfonyl)-9-methyl-3,9-diazabicyclo[3.3.1]nonane.

12. 3 - (3 - hydroxypropyl) - 9-methyl-3,9-diazabicyclo[3.3.1]nonane.

13. 3 - (2,4-dichlorobenzyl)-9-methyl-3,9-diazabicyclo[3.3.1]nonane.

14. 3 - (4 - butylmercaptobenzhydryl) - 9-methyl-3,9-diazabicyclo[3.3.1]nonane.

15. 9 - methyl - 3 - phenylazo-3,9-diazabicyclo[3.3.1]nonane.

16. 3 - (3 - indolyl)methyl - 9-methyl-3,9-diazabicyclo[3.3.1]nonane.

17. 3 - (3-chloro-4-methylphenyl)-9-methyl-2,4-dioxo-3,9-diazabicyclo[3.3.1]nonane.

18. 3 - benzyl - 7 - methoxy-2,4-dioxo-9-methyl-3,9-diazabicyclo[3.3.1]nonane.

19. 3 - benzyl - 7 - methoxy-9-methyl-3,9-diazabicyclo[3.3.1]nonane.

20. 3 - R - 9 - methyl - 3,9-diazabicyclo[3.3.1]nonane, wherein R is a member selected from the group consisting of:

(a) lower alkyl substituted by from one to three substituents selected from the group consisting of hydroxy, lower alkyl-O—, lower alkylmercapto, di(lower alkyl)carbamyl, lower alkyl-O—CO—, and carbo-ω-di(lower alkyl)aminoalkyl-oxy;

(b) lower alkenyl;
(c) lower alkynyl;
(d) carbamyl;
(e) thiocarbamyl and thiocarbamyl substituted by a member of the group consisting of allyl phenyl, naphthyl; pyridyl, furyl; quinolinyl; benzyl; benzhydryl; and phenyl, naphthyl, pyridyl, furyl, quinolinyl, benzyl and benzhydryl in which at least one ring thereof is substituted with from one to three substituents selected from the group consisting of hydroxy, lower alkoxy, lower alkylmercapto, halo, nitro, lower alkyl, amino and trifluoromethyl;
(f) lower alkanesulfonyl;
(g) benzenesulfonyl and benzenesulfonyl substituted with from one to three substituents selected from the group consisting of lower alkyl, lower alkyloxy, nitro, halo and lower alkyl-mercapto;
(h) di(lower alkyl)sulfamyl; and
(i) benzhydryl and benzhydryl in which at least one benzene ring thereof is substituted with from one to three substituents selected from the group consisting of hydroxy, lower alkoxy, lower alkyl-mercapto, amino, di(lower alkyl)amino, halo, lower alkyl, nitro and trifluoromethyl.

References Cited by the Examiner

Barnes et al.: Journal American Chemical Society, volume 75, pages 979–977 (1953).

Blackman et al.: Journal Organic Chemistry, volume 26, pages 2750–2755 (1961).

Cignarella et al.: Gazzetta Chima. Ital., volume 90, pages 1495–1504 (1960).

Rubtsov et al.: Journal Medicinal and Pharmaceutical Chemistry, volume 3, No. 3, pages 441–459 (May 18, 1961).

Schipper et al.: Journal Organic Chemistry, volume 26, pages 3599–3602 (1961).

NICHOLAS S. RIZZO, *Primary Examiner.*

IRVING MARCUS, WALTER A. MODANCE, *Examiners.*